(12) United States Patent
Kanao

(10) Patent No.: US 8,985,157 B2
(45) Date of Patent: Mar. 24, 2015

(54) METHOD FOR PULLING IN RESTORATION PIPE AND RESTORED PIPELINE

(71) Applicant: Kanaflex Corporation, Osaka (JP)

(72) Inventor: Shigeki Kanao, Hyogo (JP)

(73) Assignee: Kanaflex Corporation, Osaka (JP)

( * ) Notice: Subject to any disclaimer, the term of this patent is extended or adjusted under 35 U.S.C. 154(b) by 0 days.

(21) Appl. No.: 14/365,216

(22) PCT Filed: May 29, 2013

(86) PCT No.: PCT/JP2013/064894
§ 371 (c)(1),
(2) Date: Jun. 13, 2014

(87) PCT Pub. No.: WO2013/180170
PCT Pub. Date: Dec. 5, 2013

(65) Prior Publication Data
US 2014/0366977 A1    Dec. 18, 2014

(30) Foreign Application Priority Data

May 29, 2012 (JP) ................................. 2012-121465
May 29, 2012 (JP) ................................. 2012-121466

(51) Int. Cl.
*F16L 55/16* (2006.01)
*F16L 55/165* (2006.01)
*E03F 7/00* (2006.01)

(52) U.S. Cl.
CPC .............. *F16L 55/1652* (2013.01); *E03F 7/00* (2013.01)
USPC ............... 138/98; 138/97; 264/516; 264/269; 264/36.16; 405/150.1; 405/184.1; 156/294

(58) Field of Classification Search
USPC ............. 138/98, 97; 405/150.1, 184.1, 184.2, 405/183.5; 264/516, 269, 40.6, 40.3; 156/294, 295
See application file for complete search history.

(56) References Cited

U.S. PATENT DOCUMENTS 4,657,436 A * 4/1987 Yarnell ...................... 405/184.1
4,789,268 A * 12/1988 Yarnell ...................... 405/184.2
(Continued)

FOREIGN PATENT DOCUMENTS

| JP | 9-195677 | 7/1997 |
| JP | 2002-38581 | 2/2002 |
| JP | 2004-239403 | 8/2004 |

OTHER PUBLICATIONS

International Search Report (ISR) issued Sep. 3, 2013 in International (PCT) Application No. PCT/JP2013/064894.
(Continued)

*Primary Examiner* — Patrick F Brinson
(74) *Attorney, Agent, or Firm* — Wenderoth, Lind & Ponack, L.L.P.

(57) ABSTRACT

Provided is a restoration pipe pulling-in method which can easily determine whether pilling-in of a restoration pipe is possible wherein the restoration pipe has a diameter as much as large relative to a deteriorated drainage channel, and which can pulling a restoration pipe into a sewer pipe wherein the gap between the restoration pipe and the sewer pipe is shorter. The restoration pipe pulling-in method comprises preparing a dummy restoration pipe 30' which imitates the restoration pipe; attaching a determination jig 10 for determining whether pulling-in of the restoration pipe is possible to an insertion-side leading end portion of the dummy restoration pipe 30'; pulling the dummy restoration pipe 30' with the determination jig 10 into the existing pipe 1; after confirming completion of passing-through of the dummy restoration pipe 30' with the determination jig 10, attaching a pull-in jig to a leading end portion of the restoration pipe; and arranging the restoration pipe over an entire length of the existing pipe 1, by inserting the restoration pipe with the pull-in jig, through an upper opening 2b of the existing pipe 1, into the existing pipe 1, and by pulling the pull-in jig with a wire.

11 Claims, 15 Drawing Sheets

(56) References Cited

U.S. PATENT DOCUMENTS

| | | | |
|---|---|---|---|
| 4,950,446 A * | 8/1990 | Kinumoto et al. | 264/516 |
| 5,101,863 A * | 4/1992 | Fujii et al. | 138/98 |
| 5,213,727 A * | 5/1993 | Gargiulo | 264/40.3 |
| 7,052,567 B1 * | 5/2006 | Blackmore et al. | 156/94 |
| 7,717,648 B2 * | 5/2010 | Kanao | 405/184.2 |
| 2011/0236138 A1 * | 9/2011 | Cosban | 405/184.2 |

OTHER PUBLICATIONS

Written Opinion issued Sep. 3, 2013 in International (PCT) Application No. PCT/JP2013/064894, together with English translation thereof.

* cited by examiner upstream · · · downstream upstream · · · downstream

METHOD FOR PULLING IN RESTORATION PIPE AND RESTORED PIPELINE

TECHNICAL FIELD

The present invention relates to a method for pulling in a restoration pipe to restore an existing pipe, by pulling a new resin restoration pipe into the existing pipe having a crack or a damage thereon, or having a reduced water tightness in a pipe joint portion thereof, due to earth pressure or repeated load caused by travel of vehicles or the like, or due to seismic vibrations, over a long time after the existing pipe was buried under the ground.

BACKGROUND ART

In a sewer pipe having been buried under the ground for a long time, there arises a problem that the load carrying capacity is reduced to cause collapse of a road or the flow capacity becomes insufficient.

A method and an apparatus for solving such problem are disclosed in Patent Literatures 1 and 2.

A drainage pipe repairing apparatus described in Patent Literature 1 shown in FIG. 17 forms a new resin drainage pipe inside a deteriorated sewer pipe. With the drainage pipe repairing apparatus, a pipe body can be formed in an existing pipe in a simple manner, without using construction facilities for excavating earth.

In the case of the drainage pipe repairing apparatus, a resin pipe 50 (generally referred to as "corrugated pipe" or "waved pipe") having flexibility is led out from a rotating drum 51, then inserted, through a manhole 52 on the left side, into an existing sewer pipe 53 from one side thereof, and then pulled in, by a winch 54, via a manhole 52 on the right side. In FIG. 17, the leading end of the resin pipe 50 has a cap 55 for the pulling-in, which is attached thereto, and the cap 55 has a wire 56 connected thereto.

In a pipeline restoration method described in Patent Literature 2, a restoration pipe formed from a thermoplastic material so as to have an outer diameter smaller than the inner diameter of a sewer pipe is pulled, through a manhole, into the sewer pipe to be restored. Then, hot air of 100° C. or higher is sent into the restoration pipe to be enclosed therein to an appropriate extent, whereby the restoration pipe is heated to have an enlarged diameter, thereby being brought into close contact of it with the inner wall of the sewer pipe.

The restoration pipe to be used in this pipeline restoration method is formed into a flatten shape in the diameter direction of the pipe when being pulled into the sewer pipe, and after the restoration pipe has been pulled into the sewer pipe, the shape of the restoration pipe is changed into a cylindrical shape with the hot air, and the diameter thereof is forcedly enlarged. In this manner, the restoration pipe is brought into close contact with the inner wall of the sewer pipe, whereby the inner wall of the sewer pipe can be lined.

PRIOR ART LITERATURE

Patent Literature

Patent Literature 1: Japanese Laid-Open Patent Publication No. 2002-38581
Patent Literature 2: Japanese Laid-Open Patent Publication No. 2004-239403

SUMMARY OF INVENTION

Problems to be Solved by the Invention

In a sewer pipe buried under the ground, a shift, a bend, or the like may occur at a connection portion thereof over a long time. When a restoration pipe is inserted into a sewer pipe having such a shift, a bend, or the like, in a case where degree of the shift or the bend is large, or an obstacle is present in the connection portion thereof, a problem arises that the restoration pipe is prevented from being pulled in even if the restoration pipe is flexible.

In order to carry out safe and efficient pulling-in work for the entire length of the sewer pipeline, it is necessary to avoid the above problem. Thus, with the conventional method and apparatus, it cannot be helped to use a restoration pipe whose outer diameter is considerably smaller than the inner diameter of the sewer pipe.

However, after such pipeline has been restored, there is a problem that the diameter of the sewer pipe has been considerably reduced, and thus, the draining ability is reduced to a great extent. Moreover, although not necessary in terms of the structure, due to a request or the like from a client, it may be necessary to perform post-treatment of injecting a filler into a gap, between the outer wall of the restoration pipe and the inner wall of the sewer pipe, that is caused when the restoration pipe was pulled into the sewer pipe. If such treatment is performed, it becomes actually impossible to restore the pipeline next time.

In the case of the drainage pipe repairing apparatus described in Patent Literature 1, a rotating drum and a winch are needed to be set near manholes. In the case of the pipeline restoration method described in Patent Literature 2, a hot air generator and a pressurizer are needed to be set near a manhole.

While the rotating drum and the winch, and the hot air generator and the pressurizer are set, the vicinity of the manhole is occupied by these apparatuses. However, there are cases where the vicinity of the manholes cannot be occupied.

For example, in the case of a manhole provided in the middle of an intersection of fundamental roads with large traffic, if the vicinity of the manhole in the intersection is occupied even for a short time period, a big traffic jam is caused, and city functions are stopped.

The restoration pipe to be used in the method of Patent Literature 2 has to be made thin due to the above-described configuration, and thus, it is difficult to secure a sufficient mechanical strength thereof. Therefore, the method of Patent Literature 2 would not be preferable for ensuring long-term stability and safety.

The present invention has been made in consideration of the above problems in the conventional drainage pipe repairing methods as described above. A first object of the present invention is to provide a restoration pipe pulling-in method that allows a restoration pipe having a diameter greater than that of a conventional restoration pipe to be smoothly pulled into a sewer pipe, and to provide a restored pipeline.

Associated with the first object, a subordinate object of the present invention is to provide a restoration pipe pulling-in method that can prevent occurrence of an inefficient situations in which, in the step of pulling in the restoration pipe, the restoration pipe becomes no longer able to be pulled in while being pulled in, and the restoration pipe that has been pulled in halfway has to be removed off, and a restoration pipe with a smaller diameter is newly pulled in.

Moreover, a second object of the present invention is to provide a restoration pipe pulling-in method that allows a restoration pipe to be pulled in even when the vicinity of a manhole on the ground cannot be occupied.

Solution to the Problems

The present invention relates to a restoration pipe pulling-in method for pulling, as a restoration pipe, a resin pipe having flexibility into an existing pipe, the method of the present invention comprises:

a preparation step of preparing a dummy restoration pipe which imitates the restoration pipe;

a determination jig attaching step of attaching a determination jig for determining whether pulling-in of the restoration pipe is possible to an insertion-side leading end portion of the dummy restoration pipe;

a dummy pulling-in step of pulling the dummy restoration pipe with the determination jig into the existing pipe;

a pull-in jig attaching step of attaching, after confirming completion of passing-through of the dummy restoration pipe with the determination jig, a pull-in jig to a leading end portion of the restoration pipe; and an arrangement step of arranging the restoration pipe over an entire length of the existing pipe, by inserting the restoration pipe with the pull-in jig, through an opening of the existing pipe, into the existing pipe, and by pulling the pull-in jig with a wire.

In the present invention, the existing pipe may be a drainage channel connected between manholes, and the restoration pipe with the pull-in jig can be carried into one of the manholes through an upper opening thereof, and further inserted into the drainage channel through an opening of the drainage channel, and the pull-in jig can be pulled with the wire from the other manhole side.

In the present invention, the restoration pipe pulling-in method preferably further comprises:

a pull-back jig attaching step of attaching a pull-back jig to a rear end portion of the dummy restoration pipe, wherein in the dummy pulling-in step, when a failure of pulling-in of the dummy restoration pipe with the determination jig has occurred in the existing pipe, the dummy restoration pipe having the determination jig and the pull-back jig can be pulled back by a wire connected to the pull-back jig.

In the present invention, the determination jig preferably includes: an insertion part having a conical shape; a cylindrical body part extended from a peripheral edge of the insertion part; and a cylindrical fixing part extended rearward from the cylindrical body part and having a reduced diameter relative to that of the cylindrical body part, and for fixing the dummy restoration pipe thereon.

In the present invention, the cylindrical body part is preferably formed to have an outer diameter greater than an outer diameter of the restoration pipe.

In the present invention, the determination jig preferably further includes an untwisting member inside the insertion part and the cylindrical body part.

In the present invention, the restoration pipe pulling-in method preferably further comprises, before the dummy pulling-in step:

a diagnosis step of causing a diagnosis jig for detecting a narrow site in the existing pipe to pass through the existing pipe; and an excavation step of excavating and widening the detected narrow site.

In the present invention, the restoration pipe pulling-in method further comprises:

a drum setting step of setting a drum, on which the restoration pipe is wound, near and above a most upstream manhole among manholes communicating with the existing pipe;

a winch setting step of setting a winch above a most downstream manhole distanced from the most upstream manhole by at least two or more spans; and a connecting step of connecting a wire unwound from the winch to the pull-in jig, wherein in the arrangement step, by winding up the wire by the winch, the restoration pipe can be continuously pulled into the existing pipe extending for two or more spans.

In the present invention, the existing pipe may be a sewer pipe, and the restoration pipe can be pulled into the existing pipe while sewerage can be in service.

In the present invention, the restoration pipe passing through an intermediate manhole provided between the most upstream manhole and the most downstream manhole can be cut out along an inner wall surface of the intermediate manhole after the restoration pipe has been pulled therethrough.

The present invention comprised a pipeline restored by the restoration pipe pulling-in method Advantageous Effects of the Invention According to the restoration pipe pulling-in method of the present invention, with respect to an existing pipe to be restored, whether a restoration pipe can be pulled thereinto can be determined in a simple manner. Thus, a restoration pipe having a greater diameter than that of a conventional restoration pipe can be smoothly pulled into the existing pipe.

According to the restoration pipe pulling-in method of the present invention, it is also possible to continuously restore an existing pipe over a plurality of spans (the length of an existing pipe connecting adjacent two manholes is defined as one span) while sewerage is in service. Therefore, even when the vicinity of a manhole on the ground cannot be occupied, a restoration pipe can be pulled in.

DESCRIPTION OF EMBODIMENTS

Embodiment 1

Figure 1:
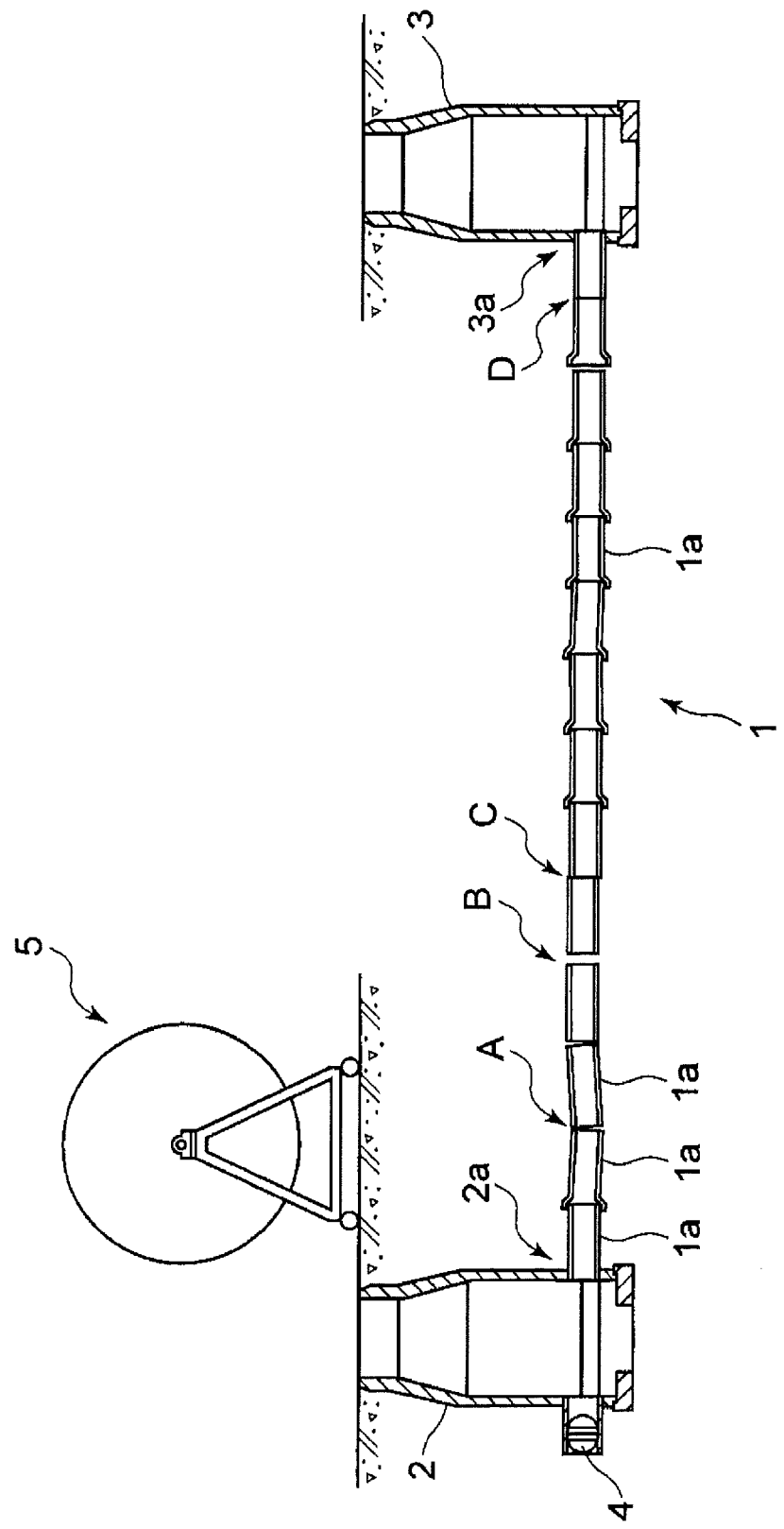
FIG. 1 is an explanatory view which illustrates a drainage channel to which a restoration pipe pulling-in method of the present invention is applied.

Hereinafter, the present invention will be described in detail based on an embodiment shown in the drawings.

[1] Check on Drainage Channel

FIG. 1 shows a drainage channel as a deteriorated existing pipe to which a restoration pipe pulling-in method of the present invention is applied.

In FIG. 1, a drainage channel 1 is formed by a plurality of drainage pipes 1a, made of concrete, being connected to each other and buried under the ground. One end portion of the drainage channel 1 is connected to, for example, a lower opening 2a provided at a lower portion of an upstream manhole 2. The other end portion of the drainage channel 1 is connected to a lower opening 3a provided at a lower portion of a downstream manhole 3.

Before the above-described drainage channel 1 is to be restored, the drainage channel 1 is checked, at first.

Specifically, a high-pressure washing vehicle is allocated, to wash the inside of the drainage channel 1 to be restored, with high-pressure water (which is referred to as a washing step).

Next, a self-propelling camera is inserted into the drainage channel 1, to search for the presence or absence of an obstacle, such as roots of a tree, that hinders pulling-in of a restoration pipe (which is referred to as a search step).

As a result of the search, if it is necessary to remove an obstacle, an in-pipe working robot is introduced into the drainage channel 1, and pre-processing such as removing the obstacle is performed (obstacle removing step). In FIG. 1, a water-stopping plug 4 for preventing sewerage from the upstream side from entering the drainage channel 1, and a drum 5 on which the restoration pipe is wound are shown.

[2] Confirmation Work During Pulling-in of Restoration Pipe

There are some cases where the pipe body of a drainage pipe 1a has been bent (see portion A) in association with deterioration thereof as shown in FIG. 2(a), a gap (see portion B) has occurred as shown in FIG. 2(b), a step (vertical shift) (see portion C) has occurred as shown in FIG. 2(c), and a horizontal shift (see portion D) has occurred as shown in the plan view of FIG. 2(d).

Thus, an allowable value is set for each of an angle of bend, a gap, a step, and a horizontal shift between drainage pipes.

For example, allowable values are respectively set, such that the angle of bend between the drainage pipes 1a is about 10° or less, the gap is about 100 mm or less, the step is about 10 mm or less, the horizontal shift is about 10 mm or less.

Each allowable value described above is set based on data indicating whether pulling-in is allowed or not, the data obtained through experiments in a plant or site operation, for each combination of a sewer pipe and a restoration pipe to be inserted in the sewer pipe.

[3] Determination Jig

A dummy restoration pipe is prepared by cutting a restoration pipe (which is described later) into a length of about 50 to 60 cm (which is referred to as a preparation step), and to one end thereof (which is referred to as an insertion-side leading end portion), a determination jig shown in FIGS. 3(a) and 3(b) is attached (which is referred to as a determination jig attaching step).

Herein, a plurality of kinds of dummy restoration pipes 30' (see FIG. 7) are prepared by cutting a plurality of kinds of restoration pipes having different diameters, respectively. Moreover, a plurality of kinds of determination jigs having different diameters are prepared, and the plurality of kinds of determination jigs are attached to the insertion-side leading end portions of their corresponding plurality of kinds of dummy restoration pipes, respectively.

It should be noted that in order to facilitate its pulling-back, a guide body (not shown) having the same shape as that of the determination jig can be provided to the rear end portion of each of the dummy restoration pipes.

FIG. 3(a) is a side cross-sectional view of the determination jig. FIG. 3(b) is a right side view thereof. Herein, FIG. 3(b) shows a state where a rear-side eyenut 15 (which is described later) is removed.

In FIGS. 3(a) and 3(b), a determination jig 10 includes a jig body 11 formed from a metal member made of iron or steel. The jig body 11 is composed of: an insertion part 11a having a conical shape; a cylindrical body part 11b extended from the peripheral edge of the insertion part 11a; and a cylindrical fixing part 11c extended rearward from the cylindrical body part 11b and having a reduced diameter relative to that of the cylindrical body part 11b, and for fixing a dummy restoration pipe 30' thereon, which are integrally formed together.

The outer diameter φE of the cylindrical fixing part 11c is substantially equal to the inner diameter of the dummy restoration pipe, such that the dummy restoration pipe 30' is fixed on the cylindrical fixing part 11c in close contact.

The outer diameter φF of the cylindrical body part 11b is set to be slightly greater than the outer diameter of the dummy restoration pipe 30'. Specifically, φF is set to be about 1 mm greater than the outer diameter of the dummy restoration pipe 30', so as to intentionally prevent free-passage thereof through the drainage channel 1 (so as to provide any slight restriction to free passage thereof).

Herein, at the boundary portion between the cylindrical body part 11b and the cylindrical fixing part 11c, a step 11d is provided.

The axial length L of the cylindrical body part 11b is set to be, for example, about 40 to 60 mm. The axial length of the insertion part 11a is set to be substantially F/2.

It should be noted that the dummy restoration pipe 30' is formed so as to have an appearance corresponding to a corrugated pipe or a waved pipe, which is mentioned above.

The cylindrical fixing part 11c is provided with a plurality of screw holes at equal intervals along the direction of a ridge reinforcement part spirally formed on the outer face of the dummy restoration pipe 30'. Thus, one end portion of the dummy restoration pipe 30' can be detachably fixed to the cylindrical fixing part 11c with a plurality of screws.

To the inside of the leading end portion of the determination jig 10, a nut 12 is welded. A bolt 13 arranged along a center line CL of the jig body 11 is engaged, by thread, with the nut 12.

A front-side end portion of the bolt 13 protrudes from the leading end of the jig body 11 by a predetermined length. A front-side eyenut 14 is engaged, by thread, with a front end portion of the bolt 13, thereby being integrated with the jig body 11.

The rear-side eyenut 15 is engaged, by thread, with a rear-side end portion (or a rear end portion) of the bolt 13. By another nut 16 being fastened, the rear-side eyenut 15 that has been engaged by thread can be fixed. The length of the bolt 13 is adjusted such that the rear-side eyenut 15 is accommodated within the jig body 11.

[4] Pull-in Jig

Next, the structure of a pull-in jig for pulling a restoration pipe into a drainage channel is described.

Figure 3:
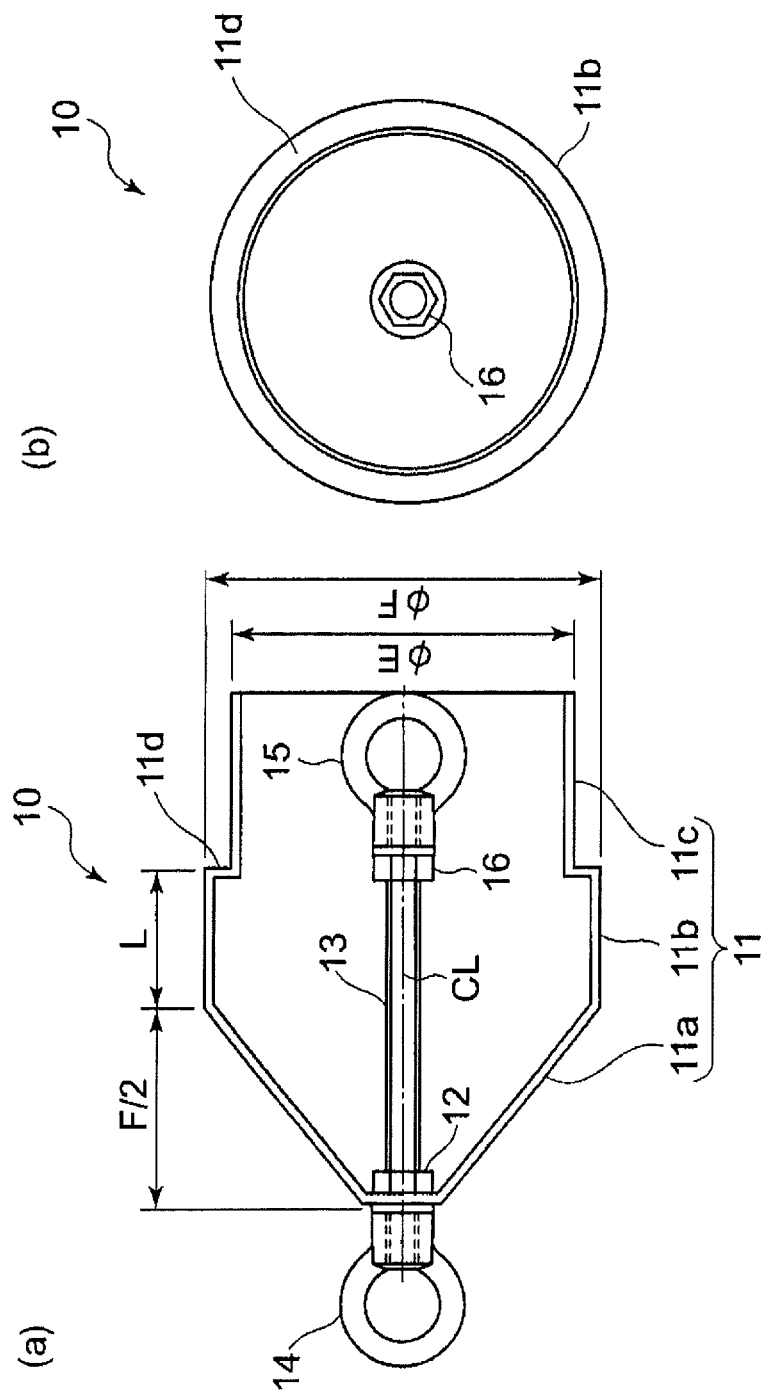
FIG. 3 (a) is a side cross-sectional view of a determination jig according to the present invention, and (b) is a right side view thereof.

FIG. 4(a) is a side cross-sectional view of the pull-in jig, and FIG. 4(b) is a right side view thereof. The same components as those of the determination jig 10 shown in FIG. 3 are denoted by the same reference numbers or characters, and the description thereof is omitted.

Figure 4:
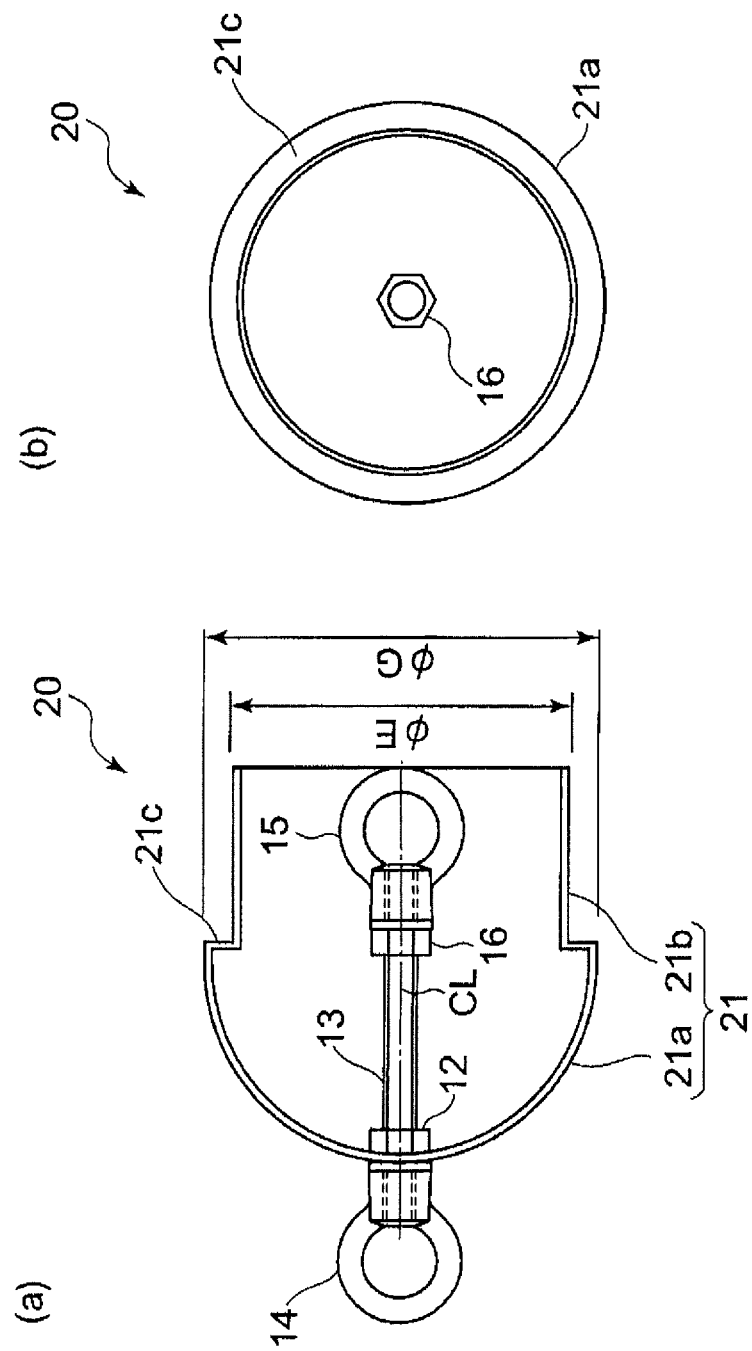
FIG. 4 (a) is a side cross-sectional view of a pull-in jig according to the present invention, and (b) is a right side view thereof.

In FIG. 4, as in the case of the determination jig 10, a pull-in jig 20 is formed from a metal member made of iron or steel. An insertion part 21a having a hemispherical shape as well as a cylindrical fixing part 21b for fixing a restoration pipe thereon are integrally formed together, thereby forming a jig body 21.

The outer diameter $\phi G$ of the insertion part 21a is set to be equivalent to or less than the outer diameter of the restoration pipe. In detail, the outer diameter $\phi G$ is set to be equivalent to or less than the outer diameter of a ridge reinforcement part (or a ridge part) spirally formed on the outer face of the restoration pipe. Accordingly, the pull-in jig 20 is connected to the restoration pipe, and flush with the restoration pipe.

Herein, in the boundary portion between the insertion part 21a and the cylindrical fixing part 21b, a step 21c is formed.

Moreover, in the cylindrical fixing part 21b, a plurality of screw holes are provided at equal intervals along the direction of the ridge reinforcement part of the restoration pipe. One end portion of the restoration pipe can be detachably fixed on the cylindrical fixing part 21b with a plurality of screws.

FIG. 5(a) is a side cross-sectional view of another pull-in jig, and FIG. 5(b) is a rear view of the pull-in jig. The same components as those of the determination jig 10 shown in FIG. 3 and those of the pull-in jig 20 shown in FIG. 4 are denoted by the same reference numbers or characters, and the description thereof is omitted.

Figure 5:
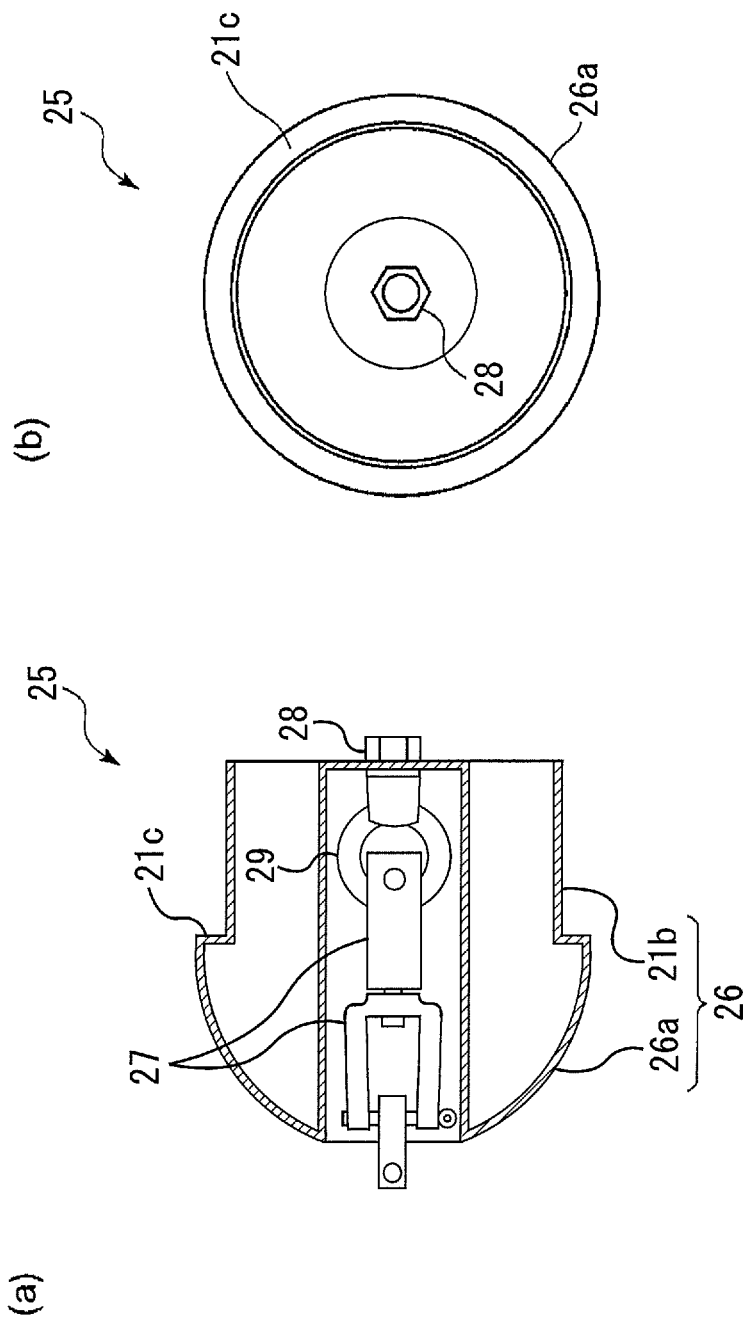
FIG. 5 (a) is a side cross-sectional view of another pull-in jig according to the present invention, and (b) is a right side view thereof.

In FIG. 5, as in the cases of the determination jig 10 and the pull-in jig 20, a pull-in jig 25 is formed from a metal member made of iron or steel. An insertion part 26a having a hemispherical shape as well as a cylindrical fixing part 21b for fixing a restoration pipe thereon are integrally formed together, thereby forming a jig body 26.

The insertion part 26a is equivalent to the insertion part 21a shown in FIG. 4, that is provided, at the center thereof, with a hole for holding an untwisting member 27 therein.

The untwisting member 27 is for relaxing twists that have occurred on the wire, and is held at a center portion of the jig body 26.

A nut 28 is welded to the outside of the rear end portion of the pull-in jig 25. An eyebolt 29 is engaged, by thread, with the nut 28, thereby being integrated with the jig body 26. Herein, instead of the nut 28 and the eyebolt 29, a bolt and an eyenut may be used.

In a case where the pull-in jig 20 shown in FIG. 4 is used to carry out the pulling-in, the pull-in jig 20 is used with an untwisting member additionally attached to the front-side eyenut 14 at the leading end of the pull-in jig 20.

On the other hand, in a case where the pull-in jig 25 is used to carry out the pulling-in, since the untwisting member 27 is hold in the pull-in jig 25, the untwisting member does not protrude from the leading end of the pull-in jig 25. Thus, the restoration pipe can be pulled into a position where the leading end of the pull-in jig 25 comes very close to a pulley 32 (see FIG. 7), and thus, its work efficiency such as efficiency of removing work of the pull-in jig 25 or cutting work of the restoration pipe can be improved.

[5] Restoration Pipe

Figure 6:
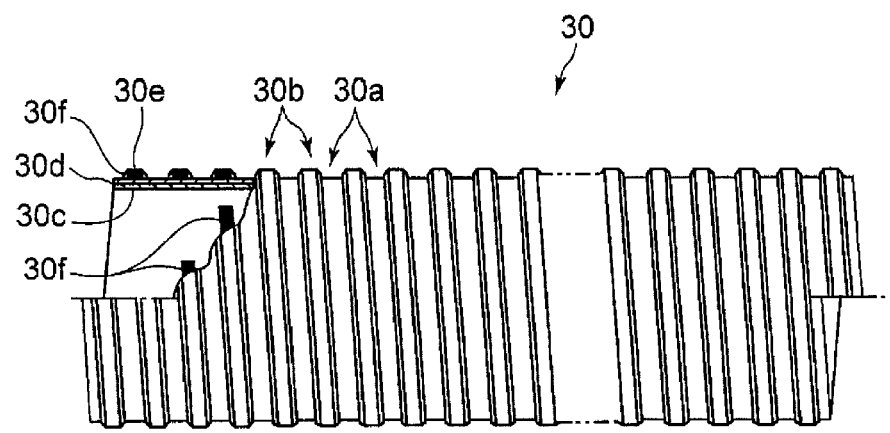
FIG. 6 is a front view showing a structure of a restoration pipe, with a portion thereof cut out, according to the present invention.

FIG. 6 is a front view showing the structure of the restoration pipe.

In FIG. 6, a restoration pipe 30 is composed of a waved resin pipe having a straight pipe part 30a and a ridge reinforcement part 30b spirally formed on the outer face of the straight pipe part 30a.

With respect to the restoration pipe 30, for example, the outer diameter is from 150 to 450 mm, the inner diameter is from 135 to 435 mm, the spiral pitch is from 8 to 40 mm, the height of a core in the ridge reinforcement part 30b is from 6 to 20 mm, and the width of the core is from 6 to 30 mm.

With respect to the spiral pitch and the core width, which are mentioned above, when the spiral pitch is too narrow, the restoration pipe becomes difficult to be bent, and when the spiral pitch is too wide, the strength of the restoration pipe is lowered. Therefore, in order for the restoration pipe to have a sufficient easiness of bending and a sufficient strength, the width of the core is preferably set in a range of from 30 to 75% of the spiral pitch. Also, for the same reasons as described above, the thickness is preferably set in a range of from 10 to 50% of the core height.

The straight pipe part 30a includes a lower wound soft resin layer 30c and an upper wound soft resin layer 30d. On the outer face of the upper wound soft resin layer 30d, the ridge reinforcement part 30b composed of a core covering part 30e and a hard resin core 30f is wound and disposed.

The appearance of the restoration pipe 30 is similar to that of a conventional corrugated pipe. However, in the embodiment 1, since the strength of each of the components of the restoration pipe 30 is optimized, the restoration pipe 30 is formed as a self-standing restoration pipe. Therefore, it is not necessary to fill with a grout as a filler in the entirety of the gap between the inner wall of the drainage channel 1 and the outer wall of the restoration pipe 30. It should be noted that a grout can be filled, as necessary, around only inlet and outlet portions of the restoration pipe 30.

[5-1] Lower Wound Soft Resin Layer

The lower wound soft resin layer 30c can be formed from a thermoplastic resin excellent in chemical resistance, such as, for example, a vinyl chloride resin, a polyolefin resin, or a thermoplastic elastomer based on an olefin or a styrene, etc.

[5-2] Upper Wound Soft Resin Layer

The upper wound soft resin layer 30d can be formed from a thermoplastic resin having good adhesiveness to the lower wound soft resin layer 30c and being excellent in chemical resistance, such as, for example, a thermoplastic elastomer based on a styrene, an olefin, a nylon, a polyester, a polyamide, or a polystyrene.

Herein, it is more preferable to blend an olefin-based resin with a thermoplastic elastomer as described above, since internal pressure, external pressure, flatness strength, compressive strength, and tensile strength can be improved. Examples of the olefin-based resin include PP, PE, and the like.

[5-3] Core Covering Part

The core covering part 30e is formed from a material that is the same as or similar to the material of the upper wound soft resin layer 30d. The core covering part 30e is formed into a cylindrical shape during the production step of the restoration pipe 30, and is heat-welded to the upper wound soft resin layer 30d when being spirally wound on the outer face of the upper wound soft resin layer 30d, thereby being integrated therewith.

[5-4] Core

The hard resin core 30f is preferably formed from any one of PE (polyethylene), PP (polypropylene), PPE (polyphenylene ether), PPS (polyphenylene sulfide), PEI (polyetherimide), PAR (polyarylate), PES (polyethersulfone), PEEK (polyether ether ketone), PTFE (polytetrafluoroethylene), PET (polyethylene terephthalate), PBT (polybutylene terephthalate), PA (polyamide), POM (polyacetal), a saturated polyester, and a polymer blend thereof. The hard resin core 30f is extruded into a bar shape, and is enclosed by the cylinder of the core covering part 30e, while the core covering part 30e is being formed into a cylindrical shape.

The hard resin core 30f is heat-welded with the core covering part 30e and the entire periphery of the hard resin core 30f is surrounded by the core covering part 30e, whereby the hard resin core 30f is substantially integrated with the core covering part 30e.

Further, the hard resin core 30f and the core covering part 30e can be reinforced with a reinforcing material or a filler such as a glass fiber, a carbon fiber, an aramid fiber, a potassium titanate whisker, a talc, a mica, a calcium carbonate, a carbon black, a hydrous calcium silicate, or a magnesium carbonate.

According to the restoration pipe 30 of the embodiment 1, the straight pipe part 30a is composed of the soft resin layers. Therefore, when the restoration pipe 30 is carried into the upstream manhole 2 from a drum 5 (see FIG. 1), and then successively inserted into the drainage channel 1 from the inside of the upstream manhole 2, the restoration pipe 30 can be bent at a necessary and sufficient curvature, thereby facilitating the construction.

Herein, in the embodiment 1, the restoration pipe on which the ridge reinforcement part is spirally formed has been described. However, the ridge reinforcement part is not limited to the spirally formed one, and may be formed as concentric rings provided in a repeated and successive peak-valley shape in the axial direction of the pipe.

[6] Restoration Pipe Pulling-in Method

FIG. 7 to FIG. 10 are explanatory views, each of which illustrates a restoration pipe pulling-in method.

[6-1] Inspection by Using of Determination Jig

Figure 7:
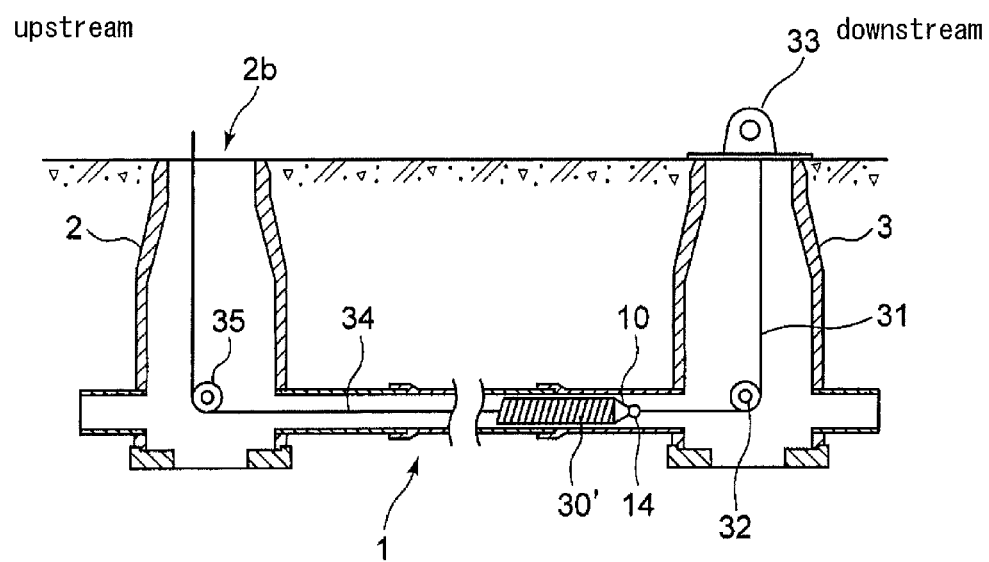
FIG. 7 is an explanatory view which illustrates confirmation work performed by a dummy restoration pipe with a determination jig.

In FIG. 7, before a restoration pipe is pulled into a drainage channel 1, an inspection work as to whether the restoration pipe can be pulled into the drainage channel 1 (see FIG. 1) is carried out, at first. Herein, the same components in FIG. 7 as those in FIG. 1 are denoted by the same reference numbers or characters, and the description thereof is omitted.

The dummy restoration pipe 30', to which the determination jig 10 (see FIG. 3) is attached, is inserted into the drainage channel 1 from an upstream manhole 2.

To the front-side eyenut 14 of the determination jig 10, one end of a wire 31 is connected. The other end of the wire 31 is to be wound-up by a winch 33 via a pulley 32 disposed in the downstream manhole 3.

Herein, to the rear-side eyenut 15 (see FIG. 3) of the determination jig 10, another wire 34 is additionally connected. In a case where the dummy restoration pipe 30' with the determination jig 10 can not advance any longer due to a bend, a step, a shift or the like of the drainage channel 1, the dummy restoration pipe 30' with the determination jig 10 is to be pulled back by the wire 34. Herein, in order to facilitate the pulling back, the rear end portion of the dummy restoration pipe 30' can also be provided with a guide body (not shown) having the same shape as that of the determination jig 10.

Figure 2:
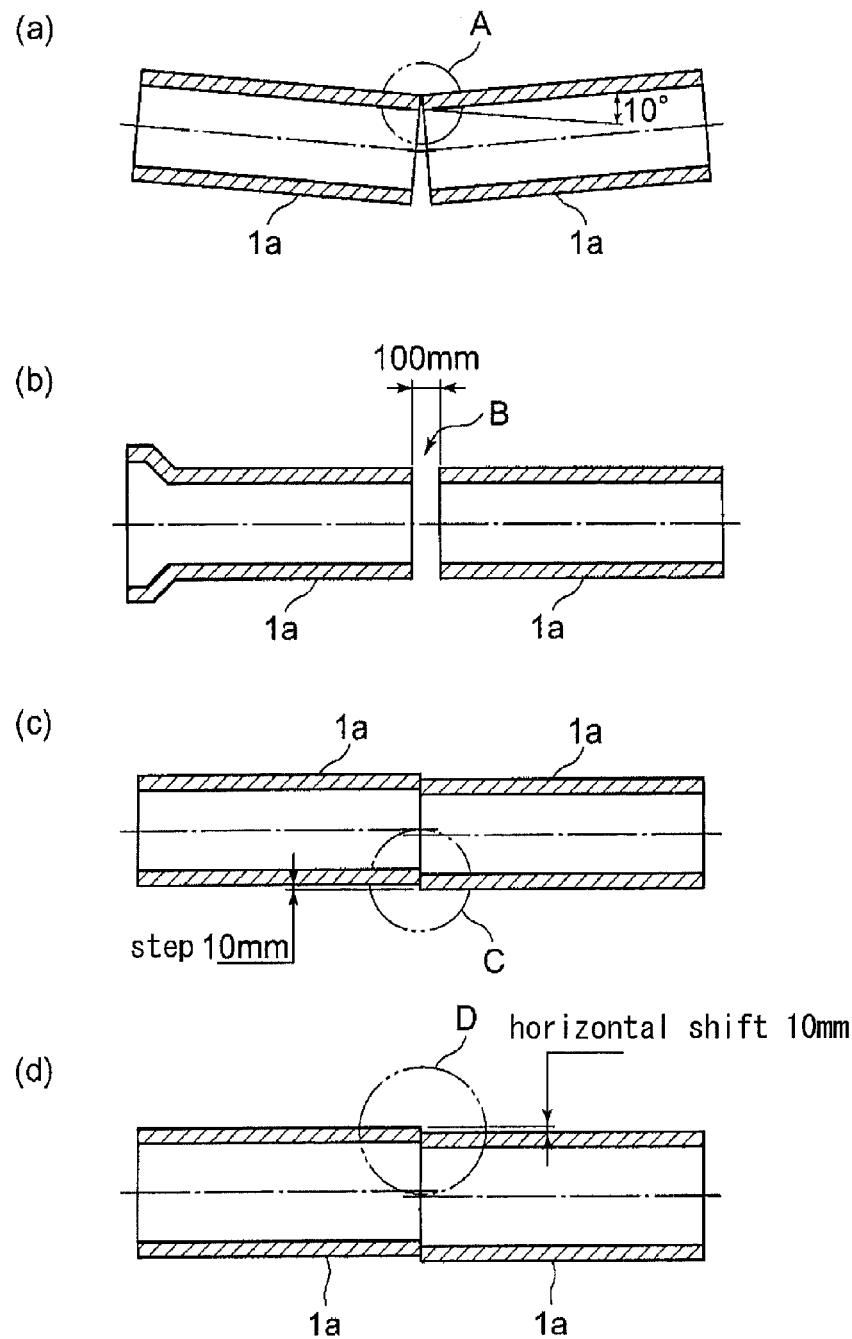
FIG. 2 (a) to (c) are front views showing a bend, a gap, and a step occurred in drainage channels, respectively, and (d) is a plan view showing a horizontal shift.

Into the drainage channel 1 which includes various kinds of displacements shown in FIG. 2, the dummy restoration pipe 30' with the determination jig 10 is inserted (which is referred to as a dummy pulling-in step).

In the case of FIG. 2(a), when the dummy restoration pipe 30' with the determination jig 10 is to be passed through two drainage pipes 1a having an angle of bend in the connection part exceeding its allowable value, since the cylindrical body part 11b of the determination jig 10 is parallel with the inner wall of the drainage pipe 1a on the downstream side, the cylindrical body part 11b comes into contact with the inner wall thereof. Thus, the dummy restoration pipe 30' with the determination jig 10 is prevented from smoothly passing therethrough.

In the case of FIG. 2(b), since the length of the cylindrical body part 11b of the determination jig 10 is set to be smaller than the allowable value of the gap, the cylindrical body part 11b gets stuck in the gap, and thus, the dummy restoration pipe 30' with the determination jig 10 is prevented from smoothly passing therethrough.

In each case of FIG. 2(c) and FIG. 2(d), when the step exceeds the allowable value, since there is little space in the gap between the outer wall of the trunk portion of the cylindrical body part 11b of the determination jig 10 and the inner diameter of the drainage pipe 1a, the cylindrical body part 11b comes into contact with the end face of the drainage pipe 1a in the downstream side, and thus, the dummy restoration pipe 30' with the determination jig 10 is prevented from smoothly passing therethrough.

If the dummy restoration pipe 30' with the determination jig 10 has smoothly passed through the drainage channel 1, even if deformation has occurred in the sewer pipe, it is determined that the restoration pipe can be pulled into the drainage channel 1.

Herein, if the dummy restoration pipe 30' with the determination jig 10 can not smoothly pass through the drainage pipes 1a, the winding-up resistance of the winch 33 increases. Therefore, by monitoring the winding-up resistance, it is possible to identify the site preventing the dummy restoration pipe 30' from passing therethrough.

If, in the identified site, for example, a step (or a vertical shift) shown in FIG. 2(c) has occurred, an in-pipe working robot is introduced in the sewer pipe to cut the inner wall of the drainage pipe 1a so as to ameliorate the step. Accordingly, the conditions that allow the restoration pipe to be pulled therein are get ready.

[6-2] Pulling-in Preparation Work (or a Pulling-in Preparatory Step)

Figure 8:
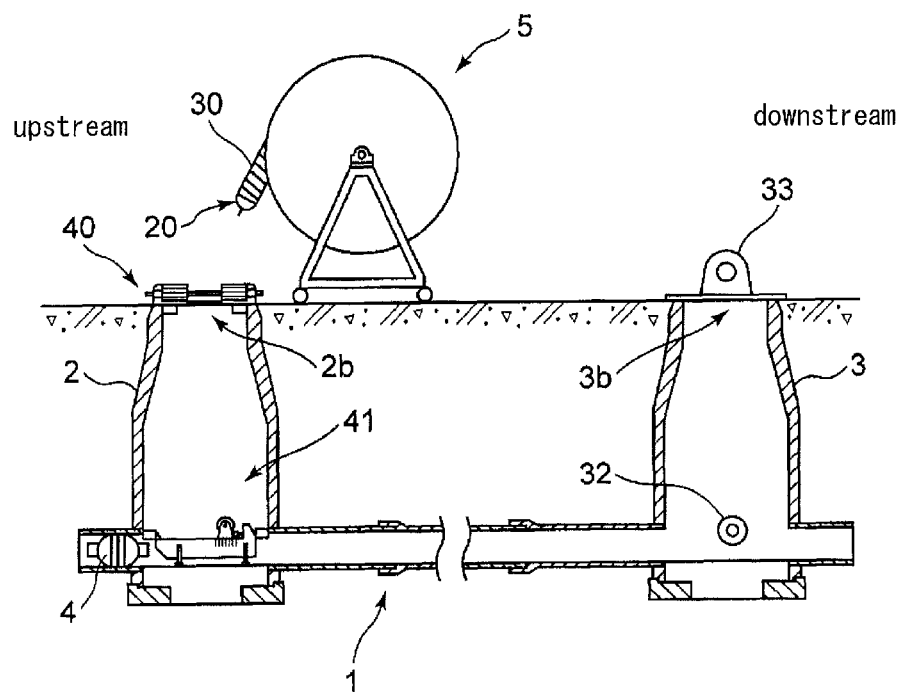
FIG. 8 is an explanatory view which illustrates preparatory work in the restoration pipe pulling-in method.

In FIG. 8, a drum 5, on which a restoration pipe 30 is wound, is disposed near an upper opening 2b of the upstream manhole 2. To the leading end portion of the restoration pipe 30, the pull-in jig 20 shown in FIG. 4, or the pull-in jig 25 shown in FIG. 5 is attached (which is referred to as a pull-in jig attaching step).

Further, above the upper opening 2b, a guide roller apparatus 40 for smoothly sending the restoration pipe 30 into the upstream manhole 2 is set.

Still further, around the bottom of the upstream manhole 2, a guide apparatus 41 is set, which changes the advancing direction of the restoration pipe descending into the upstream manhole 2 toward the drainage channel 1, i.e., into the horizontal direction.

On the other hand, above the upper opening 3b of the downstream manhole, the winch 33 and the pulley 32 shown in FIG. 7 are set.

Accordingly, the pulling-in preparation for the restoration pipe 30 is completed.

[6-3] Pulling-in Work (or an Arrangement Step)

Figure 9:
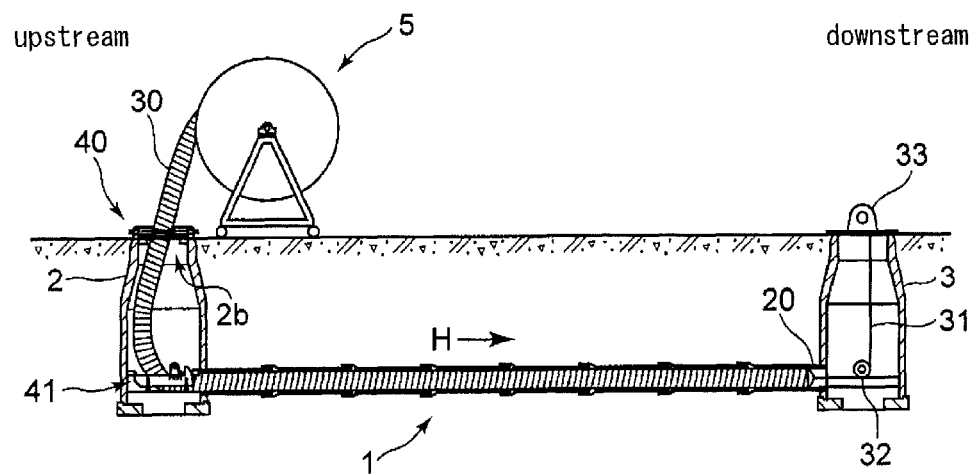
FIG. 9 is an explanatory view which illustrates restoration pipe pulling-in work.

Next, in FIG. 9, the pull-in jig 20 is attached to the leading end portion of the restoration pipe 30 unwound from the drum 5, and the restoration pipe 30 with the pull-in jig 20 is sent, through the upper opening 2b, into the upstream manhole 2. To the front-side eyenut 14 (see FIG. 4) of the pull-in jig 20, the wire 31 is connected, which was used when the dummy restoration pipe 30' with the determination jig 10 was inserted and which has been unwound from the winch 33.

In this situation, when the winch 33 is driven in the winding-up direction, the restoration pipe 30 is pulled by the wire 31 in the direction of an arrow H in the drainage channel 1.

[6-4] Fixing Work (or a Finishing Step)

After the restoration pipe 30 has passed through the drainage channel 1, in a state where the leading end portion of the restoration pipe 30 protrudes by a predetermined length from the side of the downstream manhole 3, the protruding portion thereof is cut out.

Also, on the side of the upstream manhole 2, the restoration pipe 30 extending from the drainage channel 1 is cut out.

Next, with respect to the lower opening 2a, of the upstream manhole 2, being the inlet portion to the drainage channel 1, as well as the lower opening 3a, of the downstream manhole 3, being the outlet portion from the drainage channel 1, a pipe end finishing material (or a filler) is filled in the gap between the inner wall of the drainage channel 1 and the outer wall of the restoration pipe 30, whereby both end portions of the cut restoration pipe 30 are fixed thereto.

As the pipe end finishing material mentioned above, it is desirable to use a filler that can provide high water stopping performance and high strength after hardening, such as, for example, an epoxy resin or a mortar with a quick-setting admixture.

Into the gap between the inner wall of the drainage channel 1 and the outer wall of the restoration pipe 30, but excluding the gap at the inlet portion and the gap at the outlet portion, a back-filling material (or a filler) is injected, as necessary.

Figure 10:
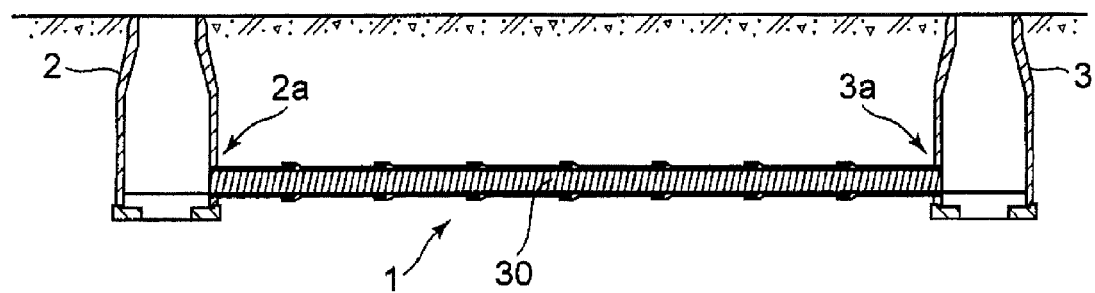
FIG. 10 is an explanatory view which illustrates a state where the pulling-in of the restoration pipe has been completed.

FIG. 10 shows the restoration pipe 30 having been passed through and fixed in the drainage channel 1.

As the back-filling material, it is desirable to use a filler that is easy to fill, such as, for example, a grout obtained by mixing a mortar with a chemical solution, or a plastic foam such as a polyurethane foam obtained by mixing an isocyanate with a polyol.

[7] Summary

According to the pipeline restoration method of the embodiment 1, with respect to an existing pipe to be restored, whether a restoration pipe can be pulled thereinto can be determined in a simple manner. Thus, a restoration pipe having a greater diameter than that of the conventional restoration pipe can be smoothly pulled into the sewer pipe.

Moreover, according to the pipeline restoration method of the embodiment 1, it is possible to prevent an occurrence of an inefficient situation in which, in the step of pulling the restoration pipe, the restoration pipe becomes no longer able to be pulled while the pulling-in operation, the restoration pipe that has been pulled in halfway has to be pulled back out, and then an alternative restoration pipe with a smaller diameter is to be newly subjected to the pulling-in operation.

<Modification 1>

In this modification 1, prior to the dummy pulling-in step of the embodiment 1, a diagnosis step and an excavation step are carried out.

In the diagnosis step, in order to detect a narrow site in the drainage channel 1, a diagnosis jig described later is caused to pass through the drainage channel 1. In the diagnosis step, preferably, this work is performed with a camera introduced so as to follow the diagnosis jig and with the passing state of the diagnosis jig being checked by means of the camera.

In the excavation step, an excavator is introduced into the narrow site, in the drainage channel 1, that has been detected in the diagnosis step, and the inner wall of the drainage channel 1 is excavated so as to widen the narrow site.

[1] Diagnosis Jig

Figure 11:
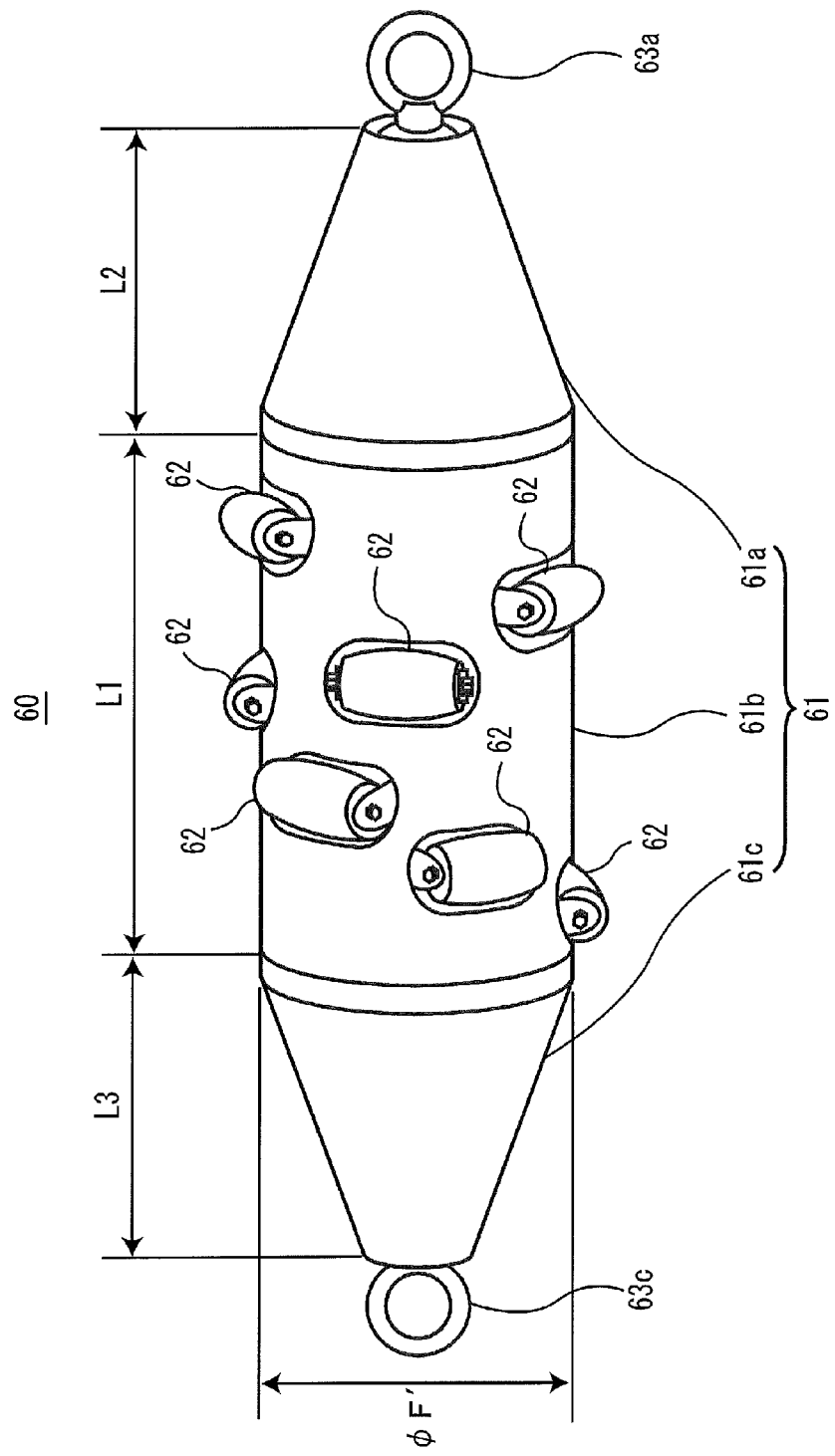
FIG. 11 is an external view of a diagnosis jig 60 according to modification 1.

FIG. 11 is an external view of a diagnosis jig 60 according to the modification 1. In FIG. 11, the diagnosis jig 60 according to the modification 1 includes a jig body 61 formed from a metal member made of iron or steel. The jig body 61 is composed of an insertion part 61a having a conical shape, a cylindrical body part 61b extended from the peripheral edge of the insertion part 61a, and a pull-back part 61c having a conical shape.

The outer diameter $\phi F'$ of the cylindrical body part 61b is set to be slightly smaller than the outer diameter of the dummy restoration pipe 30'. Specifically, $\phi F'$ is set to be smaller, by about 35 mm, than the outer diameter of the dummy restoration pipe 30', so as to easily pass through the drainage channel 1.

Herein, at the boundary portion between the insertion part 61a and the cylindrical body part 61b, and at the boundary portion between the cylindrical body part 61b and the pull-back part 61c, no step is provided in particular.

From the point of workability, there is no problem if the axial length of the diagnosis jig 60 is less than or equal to the inner diameter of a manhole (which is 900 mm in the case of Japan). For example, an axial length L1 of the cylindrical body part 61b is set to be, for example, from about 250 to 500 mm, and an axial length L2 of the insertion part 61a and an axial length L3 of the pull-back part 61c are each set to be, for example, from about 200 to 300 mm.

The diagnosis jig 60 further includes a plurality of roller parts 62 each protruding, from the surface of the cylindrical body part 61b, by about 15 mm, for example.

Each roller part 62 rotates upon bumping on the inner wall of the drainage channel 1, while the diagnosis jig 60 is passing through the drainage channel 1. Moreover, the roller part 62 is provided with a mechanism for withdrawing it inside the cylindrical body part 61b in accordance with a pressure applied by the inner wall. The roller part 62 is withdrawn to a great extent when it is passing through a narrow site in the drainage channel 1, thereby causing a sensor built therein to respond.

The diagnosis jig 60 includes an output means for outputting, for example, a sound, a light, or a signal. Upon receiving the response of the sensor, the output means provides an output, thereby being able to notify an operator that the diagnosis jig 60 is passing through a narrow site. The operator having received the output indicating that the diagnosis jig 60 is passing through the narrow site can recognize the position of the diagnosis jig 60 by means of, for example, the length of the wire 31 wound by the winch 33, and can record the position.

The leading end portion of the insertion part 61a has an eyenut 63a engaged by thread therewith.

The leading end portion of the pull-back part 61c has an eyenut 63c engaged by thread therewith.

[2] Procedure of Pipe Restoration Work

Figure 12:
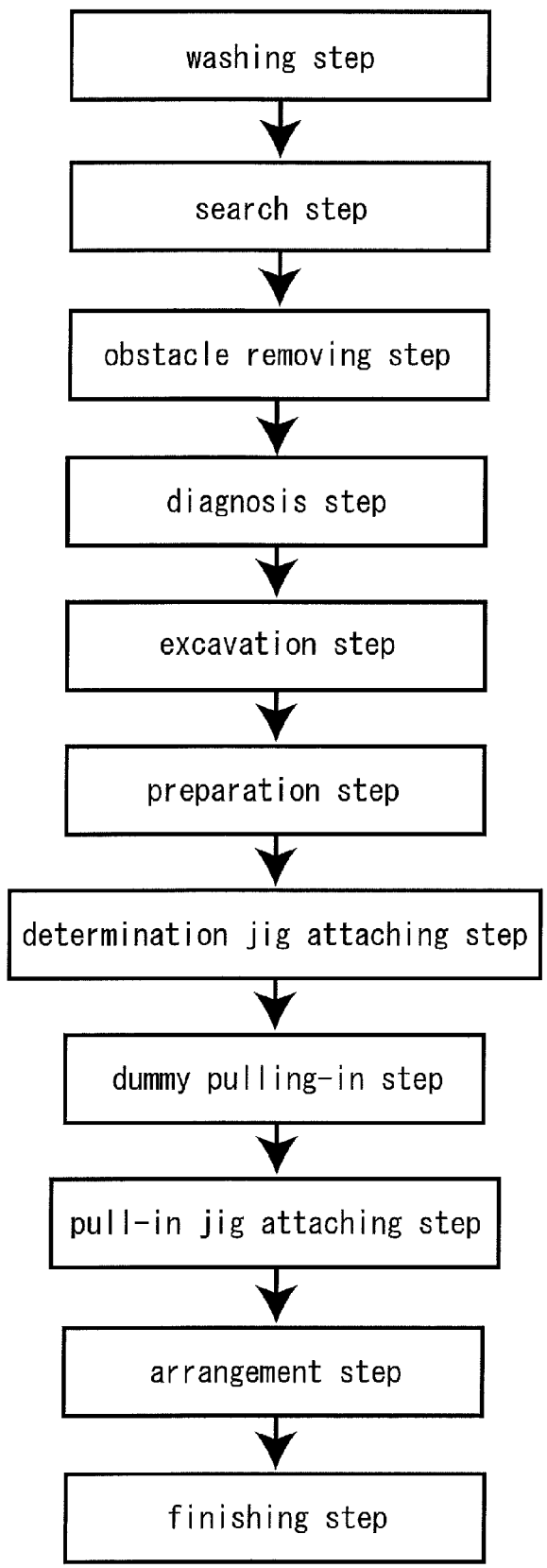
FIG. 12 is a flow chart showing a procedure of pipe restoration work in modification 1.

FIG. 12 is a flow chart showing a procedure of the pipe restoration work in the modification 1.

The procedure of the pipe restoration work is described below with reference to FIG. 12.

(1) A high-pressure washing vehicle is allocated, to wash the inside of the drainage channel 1 to be restored, with high-pressure water (which is referred to as a washing step).

(2) A self-propelling camera is introduced into the drainage channel 1 to search for the presence or absence of an obstacle, such as a root of a tree, that hinders pulling-in of the restoration pipe (which is referred to as a search step).

(3) If it is necessary to remove an obstacle, an in-pipe working robot is introduced into the drainage channel 1, and pre-processing such as removing an obstacle is carried out (which is referred to as an obstacle removing step).

(4) The diagnosis jig 60 is caused to pass through the drainage channel 1 to detect a narrow site in the drainage channel 1 (which is referred to as a diagnosis step). Herein, it should be noted that this diagnosis step may be carried out simultaneously with the search step (2) described above.

(5) An excavator is introduced into the narrow site detected in the diagnosis step, and the inner wall of the drainage channel 1 is excavated and widened such that the narrow site is widened (which is referred to as an excavation step). Herein, it should be noted that this excavation step may be carried out simultaneously with the obstacle removing step.

(6) The dummy restoration pipe 30' is prepared (which is referred to as a preparation step).

(7) The determination jig 10 is attached to the leading end portion of the dummy restoration pipe 30' at the insertion-side (which is referred to as a determination jig attaching step).

(8) The dummy restoration pipe 30' with the determination jig 10 is pulled into the drainage channel 1 (which is referred to as a dummy pulling-in step).

(9) After completion of the passing-through of the dummy restoration pipe 30' with the determination jig 10 has been confirmed, the pull-in jig 20 or 25 is attached to the leading end portion of the restoration pipe 30 (which is referred to as a pull-in jig attaching step).

(10) A restoration pipe with the pull-in jig is introduced into the drainage channel 1 and the pull-in jig 20 or 25 is pulled with a wire, whereby the restoration pipe 30 is arranged over the entire length of the drainage channel 1 (which is referred to as an arrangement step).

(11) Portions of the restoration pipe 30 that are protruding from the drainage channel 1 are cut out, and a pipe end finishing material is filled into the gaps, whereby both end portions of the cut restoration pipe 30 are fixed thereto (which is referred to as a finishing step).

[3] Summary

According to the pipeline restoration method of the modification 1, in a case where there are a plurality of narrow sites in the drainage channel 1, by only causing the diagnosis jig 60 to pass therethrough once in the diagnosis step, all of the narrow sites therein are recognized. Therefore, by carrying out the diagnosis step and the excavation step before carrying out the dummy pulling-in step, it is possible to greatly reduce the work load of pulling back again the dummy restoration pipe 30' with the determination jig 10 that had been pulled in halfway in the dummy pulling-in step, and thus, the work-efficiency can be increased.

Embodiment 2

[1] Check on Drainage Channel

Figure 13:
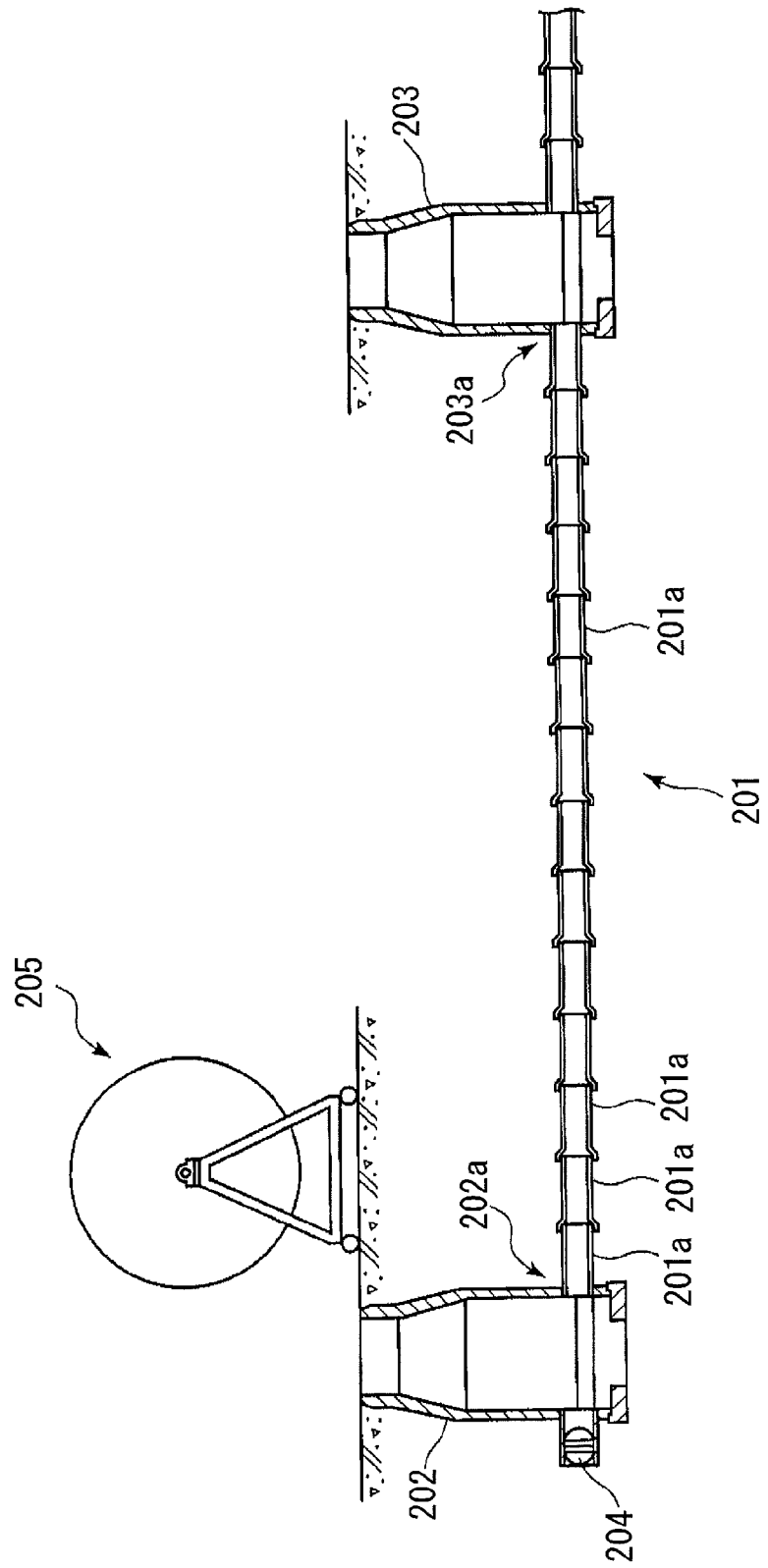
FIG. 13 is an explanatory view which illustrates a drainage channel to which a pipeline restoration method of the present invention is applied.

FIG. 13 shows a drainage channel as a deteriorated existing pipe to which the pipeline restoration method of the present invention is applied.

In FIG. 13, a drainage channel 201 is formed by a plurality of drainage pipes 201a, made of concrete, being connected to each other and buried under the ground. One end portion of the drainage channel 201 is connected to, for example, a lower opening 202a provided at a lower portion of a most upstream manhole 202. The other end portion of the drainage channel 201 is connected to a lower opening 203a provided at a lower portion of a downstream manhole 203.

Before the drainage channel 201 described above is to be restored, the drainage channel 201 is checked, at first.

Specifically, a high-pressure washing vehicle is allocated near the downstream manhole 203, to wash the inside of the drainage channel 201 with high-pressure water (which is referred to as a washing step).

Next, a self-propelling camera (not shown) is introduced into the drainage channel 201, to search for the presence or absence of an obstacle, such as root of a tree, that hinders the pulling-in of a restoration pipe (which is referred to as a search step).

As a result of this search, if it is necessary to remove the obstacle, an in-pipe working robot is introduced into the drainage channel 201, and pre-processing such as removing the obstacle is carried out (which is referred to as an obstacle removing step). Herein, in FIG. 13, a water stopping plug 204 for preventing sewerage from the upstream side from entering the drainage channel 201, and a drum 205 on which the restoration pipe is wound up are shown. Herein, it should be noted that if conditions of the flow rate not greater than 0.8 m/s or the depth of water not greater than 3 cm are satisfied, the restoration pipe can be pulled while the drainage channel 201 is in service, without using the water stopping plug 204. Herein, it should be noted that in a case where the drainage channel is to be restored over a plurality of spans, the same checking step is carried out for all the spans of the drainage channel to be restored.

[2] Restoration Pipe

The structure of the restoration pipe in the embodiment 2 is similar to that of the restoration pipe 30 in the embodiment 1 shown in FIG. 6.

In the embodiment 2, since each of the components of the restoration pipe 30 is optimized so as to attain both of the strength and the flexibility, the restoration pipe 30 is formed as a self-standing restoration pipe. Therefore, after the restoration pipe 30 has been pulled into the drainage channel 201, it is not necessary to carry out a step of heating the restoration pipe 30 to enlarge the diameter thereof so as to bring the restoration pipe 30 into close contact with the inner wall of the drainage channel 201. Therefore, if the drainage channel 201 is restored by using of the restoration pipe 30 having the above structure, any hot air generator/pressurizer for heating the restoration pipe 30 to enlarge the diameter thereof is not necessary either.

In a case where the restoration pipe 30 has been pulled into the drainage channel 201 shown in FIG. 13, a grout obtained by mixing a mortar with a chemical solution can be filled as a back-filling material, as necessary, into the small gap between the inner wall of the drainage channel 201 and the outer wall of the restoration pipe 30. The back-filling material is not limited to the grout described above, and a plastic foam such as a polyurethane foam obtained by mixing an isocyanate with a polyol can be used as the back-filling material, for example.

According to the restoration pipe 30 of the present embodiment, since the straight pipe part 30a is formed from soft resin layers, when the restoration pipe 30 is carried into the most upstream manhole 202 from the drum 205 (see FIG. 13), and then continuously inserted into the drainage channel 201 at the inside of the most upstream manhole 202, the restoration pipe 30 can be bent at a necessary and sufficient curvature, thereby facilitating the construction.

[3] Pulling-in of Restoration Pipe

[3-1] Pulling-in Preparation (or a Pulling-in Preparatory Step)

Figure 14:
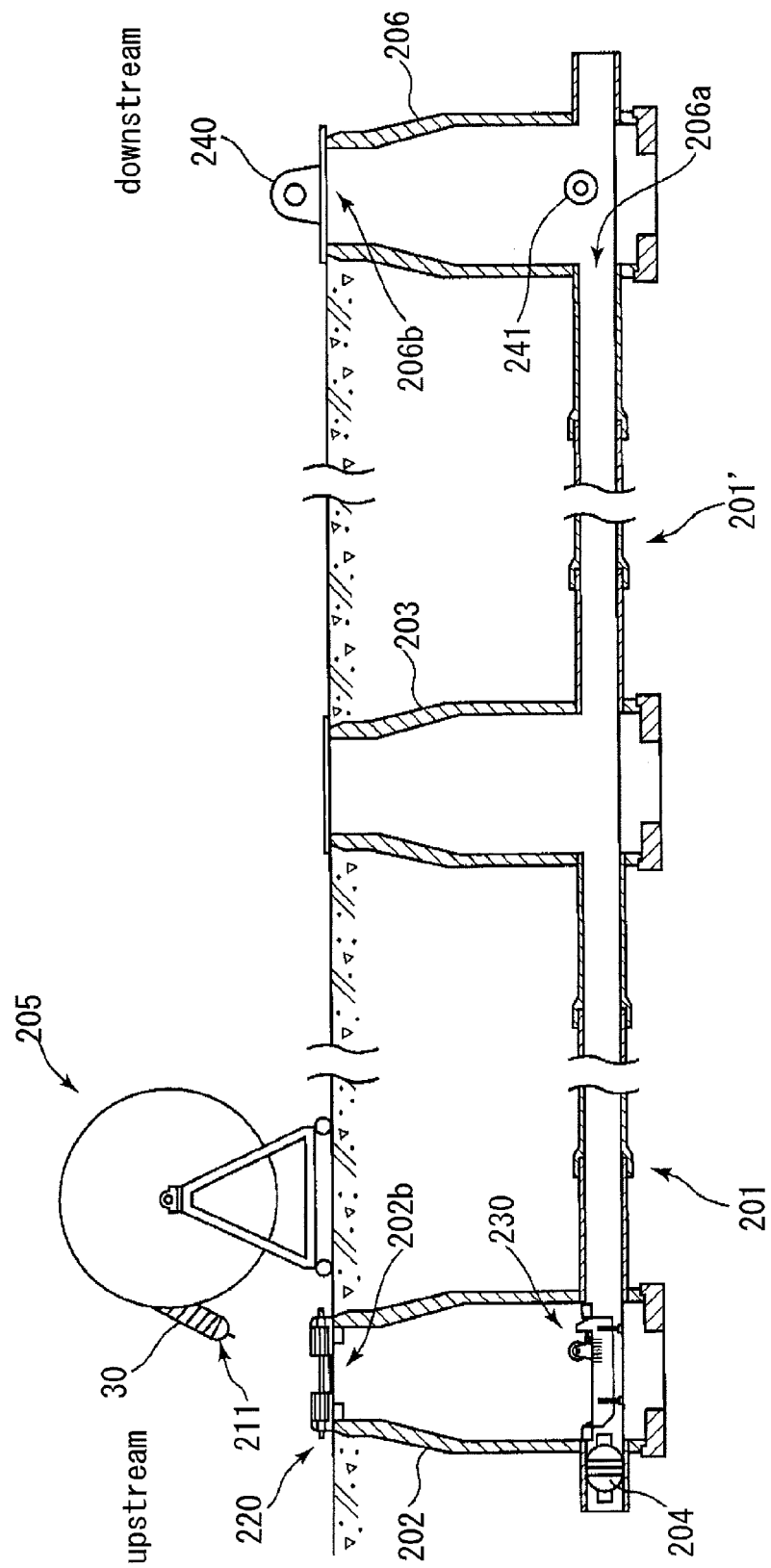
FIG. 14 is an explanatory view which illustrates a prepared state for the pipeline restoration method according to the present invention.

With reference to FIG. 14, an object of the present invention is to continuously restore the drainage channels 201 and 201' from the most upstream manhole 202 to a most downstream manhole 206 which is distanced from the most upstream manhole 202 by at least two or more spans.

The drum 205 on which the restoration pipe 30 is wound up is disposed near an upper opening 202b of the most upstream manhole 202 (which is referred to as a drum setting step). To the leading end portion of the restoration pipe 30, a pull-in jig 211 is attached.

Herein, it should be noted that the drainage channel 201 connects the most upstream manhole 202 and the manhole 203 which is located downstream to the manhole 202. The drainage channel 201' connects the manhole 203 and the most downstream manhole 206.

Further, above the upper opening 202b of the most upstream manhole 202, a guide roller apparatus 220 for smoothly sending the restoration pipe 30 into the most upstream manhole 202 is set.

Further, around the bottom of the most upstream manhole 202, a guide apparatus 230 is set, which changes the advancing direction of the restoration pipe 30 descending in the most upstream manhole 202 toward the drainage channel 201, i.e., into the horizontal direction.

On the other hand, a winch 240 above the upper opening 206b of the most downstream manhole 206, and a pulley 241 are set (which is referred to as a winch setting step). Accordingly, the pulling-in preparation for the restoration pipe 30 is completed. A lower opening 206a is provided at a lower portion of the most downstream manhole 206.

As described above, it is sufficient that those facilities which are set above the manholes to the drainage channel 201, 201' to be restored include only the drum 205 and the winch 240 which do not need any large space.

[3-2] Pulling-in of Restoration Pipe (or an Arrangement Step)

Figure 15:
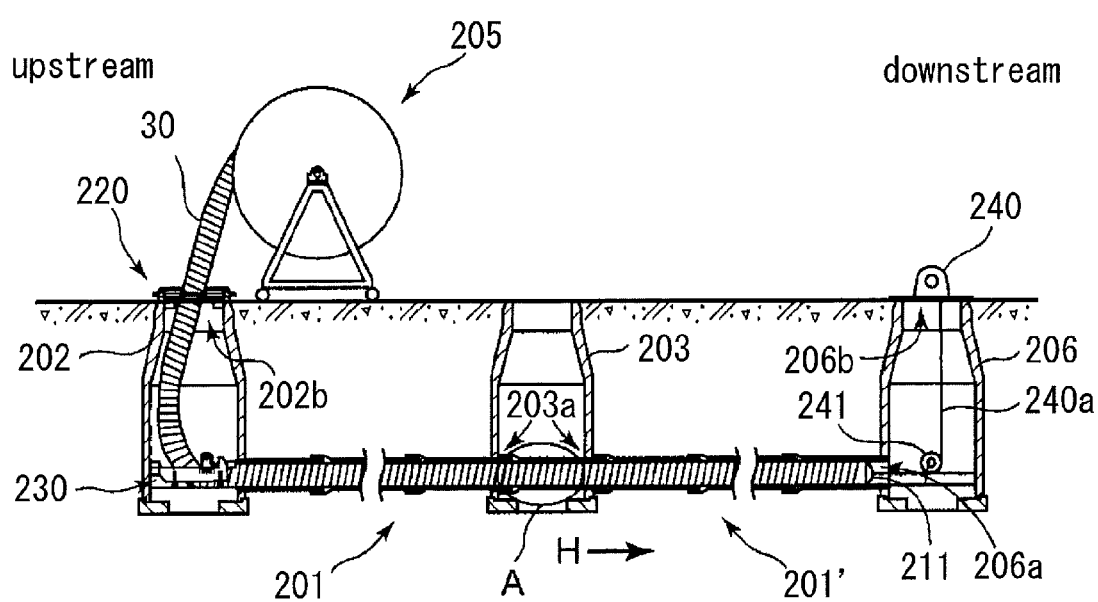
FIG. 15 is an explanatory view which illustrates the pipeline restoration method according to the present invention.

With reference to FIG. 15, the pull-in jig 211 is attached to the leading end portion of the restoration pipe 30 unwound from the drum 205, and the restoration pipe 30 with the pull-in jig is sent through the upper opening 202b into the most upstream manhole 202. To the pull-in jig 211, a wire 240a unwound from the winch 240 which is set above the most downstream manhole 206 is connected (which is referred to as a connecting step).

In this state, when the winch 240 is driven in the winding-up direction, the restoration pipe 30 is pulled by the wire 240a in the direction of the arrow H in the drainage channel 201.

Accordingly, the restoration pipe 30 is pulled into the drainage channel 201 which is connected to the most upstream manhole 202 and the intermediate manhole 203, and then, continuously pulled into the drainage channel 201' which is connected to the intermediate manhole 203 and the most downstream manhole 206.

[3-3] Fixing Work (or a Finishing Step)

After the restoration pipe 30 has passed through the drainage channel 201', in a state where the leading end portion of the restoration pipe 30 protrudes by a predetermined length from the lower opening 206a of the most downstream manhole 206, the protruding leading end portion is cut out.

With respect to the restoration pipe 30 passing through the intermediate manhole 203, a portion A extending across the manhole is cut out, and the cut ends of the restoration pipe 30 are processed along the inner wall surface of the intermediate manhole 203 (so as to be substantially flush with the inner wall surface).

Also, with respect to the restoration pipe 30 pulled into the most upstream manhole 202, the restoration pipe 30 is cut such that the cut end thereof is substantially flush with the inner wall of the most upstream manhole 202.

Next, with respect to the lower opening 202a of the most upstream manhole 202, each of the lower openings 203a of the intermediate manhole 203, and the lower opening 206a of the most downstream manhole 206, a pipe end finishing material is filled in the gap between the inner wall of the drainage channel 201 and the outer wall of the restoration pipe 30, whereby each of the end portions of the cut restoration pipe 30 is fixed thereto.

[4] Summary

The restoration pipe to be used in the pipeline restoration method of the present invention is produced at a plant as a self-standing pipe having a cylindrical shape. Therefore, the step of heating/hardening/cooling the restoration pipe at site can be omitted, and the construction time can be shortened by a great extent. With a conventional resin restoration pipe, heating/hardening at site is required, and thus, countermeasures to remove odor have to be taken. However, with the pipeline restoration method of the present invention, such countermeasures need not be taken.

Further, the pipeline restoration method of the present invention is not a type in which the diameter of the restoration pipe is enlarged to bring the restoration pipe into close contact with the inner wall of the drainage channel, and thus, is also advantageous in that the restoration pipe can be pulled in while the sewerage is in service.

Figure 16:
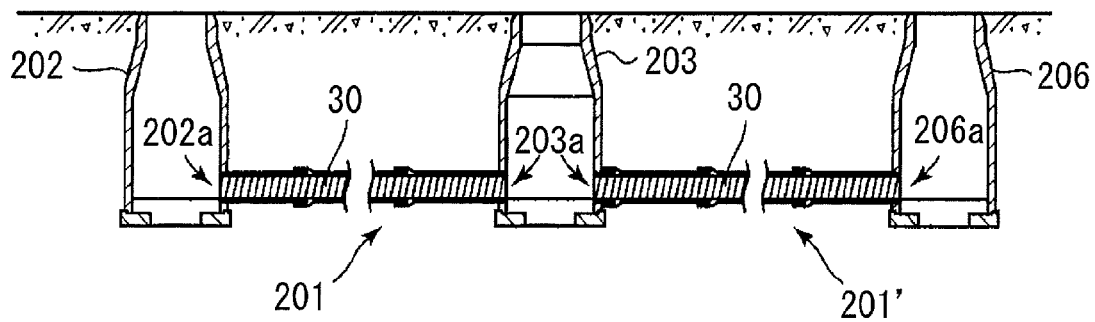
FIG. 16 is an explanatory view which illustrates a completion state of construction by the pipeline restoration method according to the present invention.
Figure 17:
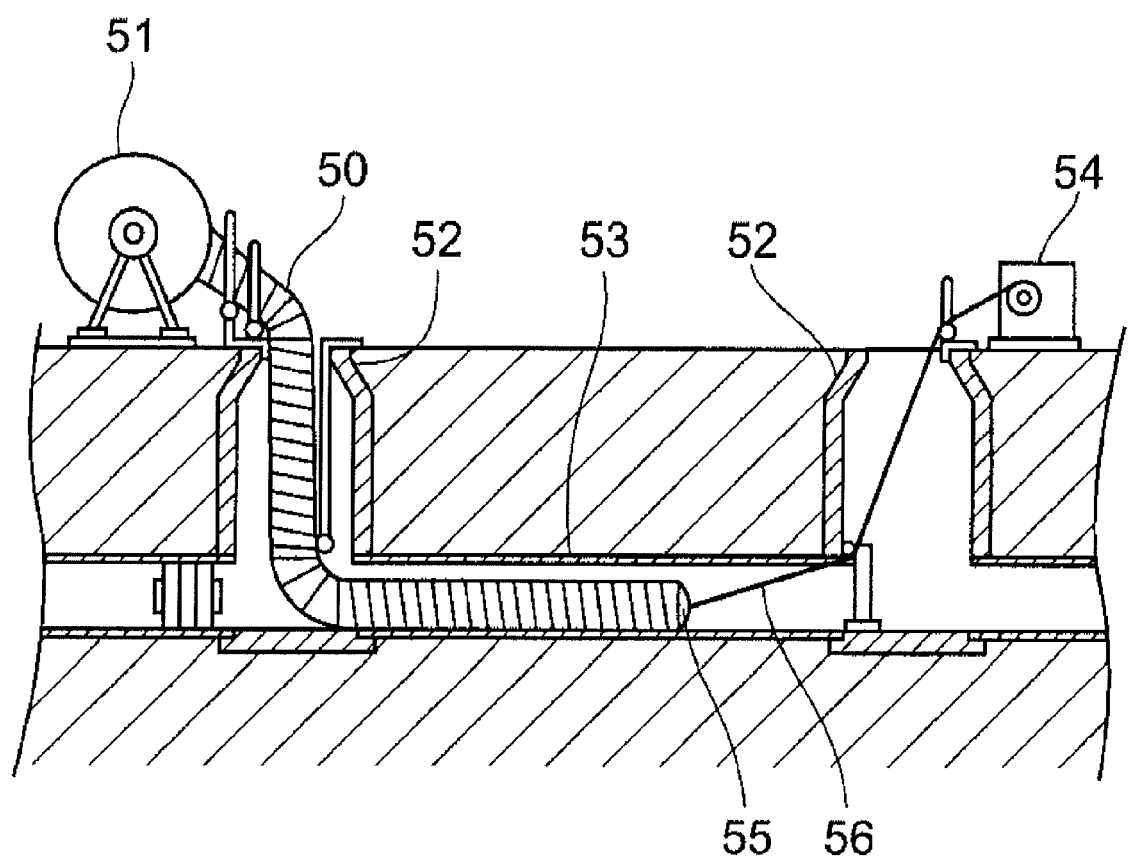
FIG. 17 is an explanatory view which illustrates a conventional drainage pipe repairing method.

FIG. 16 shows the drainage channels 201 and 201' restored by the pipeline restoration method of the present invention.

In the above embodiment, an example where the drainage channels 201 and 201' extending over two spans are to be restored has been explained. However, the present invention is not limited to the case of the two spans, and can be applied to drainage channels extending over two or more spans.

Embodiment 1, modification 1, and embodiment 2 can be combined as appropriate, as long as they are compatible.

The present application claims conventional priority based on Japanese Patent Application No. 2012-121465 filed on May 29, 2012, and Japanese Patent Application No. 2012-121466 filed on May 29, 2012. The entirety of the disclosure of Japanese Patent Application No. 2012-121465 filed on May 29, 2012 and the entirety of the disclosure of Japanese Patent Application No. 2012-121466 filed on May 29, 2012 are incorporated herein by reference.

INDUSTRIAL APPLICABILITY

The pipe guiding apparatus, the pipe inserting system, and the pipe restoration system of the present invention can be widely and appropriately applied when pipes buried under the ground, such as the main pipe and branch pipes of a drainage pipe buried under the ground, are to be restored.

DESCRIPTION OF THE REFERENCE NUMBERS OR CHARACTERS 1 drainage channel (or existing pipe)
1a drainage pipe
2 upstream manhole
2a lower opening
2b upper opening
3 downstream manhole
3a lower opening
3b upper opening
4 water stopping plug
5 drum
10 determination jig
11 jig body
11a insertion part
11b cylindrical body part
11c cylindrical fixing part
11d step
12 nut
13 bolt
14 front-side eyenut
15 rear-side eyenut
16 another nut
20 pull-in jig
20 jig body
21a insertion part
21b cylindrical fixing part
21c step
25 pull-in jig
26 jig body
26a insertion part
27 untwisting member
28 nut
29 eyebolt
30 restoration pipe
30a straight pipe part
30b ridge reinforcement part
30c lower wound soft resin layer
30d upper wound soft resin layer
30e core covering part
30f hard resin core
30' dummy restoration pipe
31 wire
32 pulley
33 winch
34 another wire
40 guide roller apparatus
41 guide apparatus
60 diagnosis jig
61 jig body
61a insertion part
61b cylindrical body part
61c pull-back part
62 roller part
63a eyenut
63c eyenut
201 drainage channel
201' drainage channel
201a drainage pipe
202 manhole
202a lower opening
202b upper opening
203 manhole
203a lower opening
204 water stopping plug
205 drum
206 manhole
206a lower opening
206b upper opening
211 pull-in jig
220 guide roller apparatus
230 guide apparatus
240 winch
240a wire
241 pulley

The invention claimed is:

1. A restoration pipe pulling-in method for pulling, as a restoration pipe, a resin pipe having flexibility into an existing pipe, the method comprising:
   a preparation step of preparing a dummy restoration pipe which imitates the restoration pipe;
   a determination jig attaching step of attaching a determination jig for determining whether pulling-in of the restoration pipe is possible to an insertion-side leading end portion of the dummy restoration pipe;
   a dummy pulling-in step of pulling the dummy restoration pipe with the determination jig into the existing pipe;
   a pull-in jig attaching step of attaching, after confirming completion of passing-through of the dummy restoration pipe with the determination jig, a pull-in jig to a leading end portion of the restoration pipe; and
   an arrangement step of arranging the restoration pipe over an entire length of the existing pipe, by inserting the restoration pipe with the pull-in jig, through an opening of the existing pipe, into the existing pipe, and by pulling the pull-in jig with a wire.

2. The restoration pipe pulling-in method according to claim 1, wherein
   the existing pipe is a drainage channel connected between manholes, and
   the restoration pipe with the pull-in jig is carried into one of the manholes through an upper opening thereof, and further inserted into the drainage channel through an opening of the drainage channel, and the pull-in jig is pulled with the wire from the other manhole side.

3. The restoration pipe pulling-in method according to claim 1, further comprising:
   a pull-back jig attaching step of attaching a pull-back jig to a rear end portion of the dummy restoration pipe, wherein
   in the dummy pulling-in step, when a failure of pulling-in of the dummy restoration pipe with the determination jig has occurred in the existing pipe, the dummy restoration pipe having the determination jig and the pull-back jig is pulled back by a wire connected to the pull-back jig.

4. The restoration pipe pulling-in method according to claim 1, wherein
   the determination jig includes: an insertion part having a conical shape; a cylindrical body part extended from a peripheral edge of the insertion part; and a cylindrical fixing part extended rearward from the cylindrical body part and having a reduced diameter relative to that of the cylindrical body part, and for fixing the dummy restoration pipe thereon.

5. The restoration pipe pulling-in method according to claim 4, wherein
   the cylindrical body part is formed to have an outer diameter greater than an outer diameter of the restoration pipe.

6. The restoration pipe pulling-in method according to claim 1, wherein
the determination jig further includes an untwisting member inside the insertion part and the cylindrical body part.

7. The restoration pipe pulling-in method according to claim 1, further comprising, before the dummy pulling-in step:
a diagnosis step of causing a diagnosis jig for detecting a narrow site in the existing pipe to pass through the existing pipe; and
an excavation step of excavating and widening the detected narrow site.

8. The restoration pipe pulling-in method according to claim 1, further comprising:
a drum setting step of setting a drum, on which the restoration pipe is wound, near and above a most upstream manhole among manholes communicating with the existing pipe;
a winch setting step of setting a winch above a most downstream manhole distanced from the most upstream manhole by at least two or more spans; and
a connecting step of connecting a wire unwound from the winch to the pull-in jig, wherein
in the arrangement step, by winding up the wire by the winch, the restoration pipe is continuously pulled into the existing pipe extending for two or more spans.

9. The restoration pipe pulling-in method according to claim 8, wherein
the existing pipe is a sewer pipe, and the restoration pipe is pulled into the existing pipe while sewerage is in service.

10. The restoration pipe pulling-in method according to claim 8, wherein
the restoration pipe passing through an intermediate manhole provided between the most upstream manhole and the most downstream manhole is cut out along an inner wall surface of the intermediate manhole after the restoration pipe has been pulled therethrough.

11. A pipeline restored by the restoration pipe pulling-in method according to claim 1.

* * * * *